United States Patent [19]

Sticker et al.

[11] Patent Number: 5,775,956
[45] Date of Patent: Jul. 7, 1998

[54] DISTRIBUTION PANELS ESPECIALLY FOR DATA TRANSMISSION NETWORKS

[75] Inventors: Rolf Sticker; Karl Muller, both of Donaueschingen; Dieter Jaag. Villingen-Schwenningen. all of Germany

[73] Assignee: BTR Blumberger Telefon-Und Relaisbau Albert Metz. Germany

[21] Appl. No.: 755,894

[22] Filed: Dec. 2, 1996

[30] Foreign Application Priority Data

Dec. 7, 1995 [DE] Germany ............ 295 19 389 U

[51] Int. Cl.$^6$ ............................................. H01R 9/24
[52] U.S. Cl. ................................. 439/719; 174/72 A
[58] Field of Search ........................... 439/719, 942; 361/825, 826, 627, 628, 629, 630, 631, 632, 633, 634, 635, 636, 637, 638, 639, 640, 641, 642, 643, 644, 645, 657; 174/135, 72 A

[56] References Cited

U.S. PATENT DOCUMENTS

| | | | |
|---|---|---|---|
| 2,233,107 | 2/1941 | Miller | 174/72 A |
| 2,712,916 | 7/1955 | Franz | 174/72 A |
| 3,055,971 | 9/1962 | Lander | 174/72 A |
| 4,831,726 | 5/1989 | Moly | 174/72 A |
| 4,926,009 | 5/1990 | Van Leeuwan | 174/135 |
| 5,158,480 | 10/1992 | Blondeel et al. | 439/719 |

FOREIGN PATENT DOCUMENTS

| | | | |
|---|---|---|---|
| 2515573 | 4/1976 | Germany | 174/72 A |
| G 92 02 912.4 | 5/1992 | Germany | |
| G 94 21 696.7 | 7/1996 | Germany | |

*Primary Examiner*—Gary F. Paumen
*Assistant Examiner*—Tho Dac Ta
*Attorney, Agent, or Firm*—Eugene E. Renz, Jr.

[57] ABSTRACT

A distribution panel, especially for data transmission networks, is described with a shaped rail, with jacks attached to the shaped rail, the plug receptacles of the jacks being arranged on the front next to one another, and with mounting tabs for cables guided along the rear to the jacks. The shaped rail has a receiving groove along its rear longitudinal edge. A support extending essentially over the entire length of the shaped rail can thus be inserted into this groove and attached to the shaped rail in such a way that the top surface of the support plate is in a plane essentially parallel to the shaped rail. The support plate has mounting tabs for the cables.

5 Claims, 2 Drawing Sheets

5,775,956

DISTRIBUTION PANELS ESPECIALLY FOR DATA TRANSMISSION NETWORKS

FIELD OF THE INVENTION

The invention pertains to a distribution panel, particularly adapted for data transmission networks.

Distribution panels of this general type, which are usually called patch panels as well, are used in the data transmission networks of Electronic Data Processing (EDP) and/or telecommunications systems to plug a plurality of individual networks or individual devices together.

A patch panel of the general type indicated above is known from DE 92 02 912.4 U1. In this patch panel, the jacks are mounted next to each other on a shaped rail, the plug receptacles being accessible from the front through windows in a front plate. The cables guided up to the rear of the patch panel and connected to the jacks are mounted on the shaped rail by means of cable binders. All the cables are perpendicular to the shaped rail and extend out past the rear edge of the shaped rail at right angles to it. The cables led to the patch panel usually pass through a common cable duct or cable conduit.

BACKGROUND OF THE INVENTION

During the installation of the patch panel, the bundle of cables must be spread out and each cable guided individually in an appropriate manner from the common cable duct or cable conduit to the cable binder assigned to the individual jack on the rear edge of the shaped rail. In the case of patch panels with a large number of plug-in points (jacks), the cables are therefore at least partially unsupported over the considerable distance that they must extend. These unsupported cables sag, are interfering, and are subject to tensile stress.

SUMMARY OF THE INVENTION

With the foregoing in mind, an object of the invention is to provide an improved patch panel of the general type described above characterized by novel features of construction and arrangement so that even when there is a large number of plug-in points, the cables can be kept in order and protected as they are guided to the jacks.

To this end, the basic idea of the invention is to attach an additional support plate to the rear edge of the shaped rail of the patch panel. Accordingly, the cables coming from the common cable duct, cable harness, or cable conduit can be attached to this support plate and then branched to the individual jacks. The cables are thus held, protected, and relieved of tensile stress.

The support plate is a separate component, which is attached to the shaped rail only if needed. The shaped rail can therefore be mass-produced in the same way both for applications with, and for those without a support plate. As a result, the production and inventory costs are minimized.

In a preferred embodiment, the support plate has a bent edge strip which fits into a receiving groove extending along the rear edge of the shaped rail. A clamping rail screwed to the shaped rail extends over the edge of the support plate and holds its edge strip in the receiving groove, so that the support plate is firmly clamped to the shaped rail. The clamping rail can preferably serve simultaneously as a grounding rail and can also be used to attached the cables at the point where they arrive at the shaped rail.

BRIEF DESCRIPTION OF THE DRAWINGS

These and other objects of the present invention and the various features and details thereof are hereafter more fully set forth with reference to the accompanying drawings, wherein.

DETAILED DESCRIPTION OF THE PREFERRED EMBODIMENTS

Figure 1:
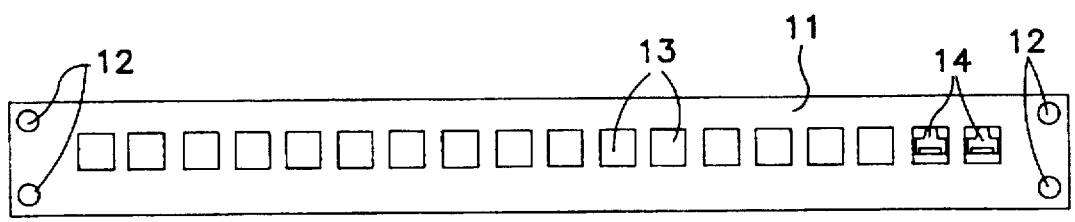
FIG. 1 shows a front view of the patch panel.

The patch panel in the exemplary embodiment shown in the drawing corresponds to the patch panel described in detail in German Patent Application No. P 4,446,513.0. Insofar as the details of the patch panel are not described below, reference is made to the specification of the cited German patent application.

Figure 2:
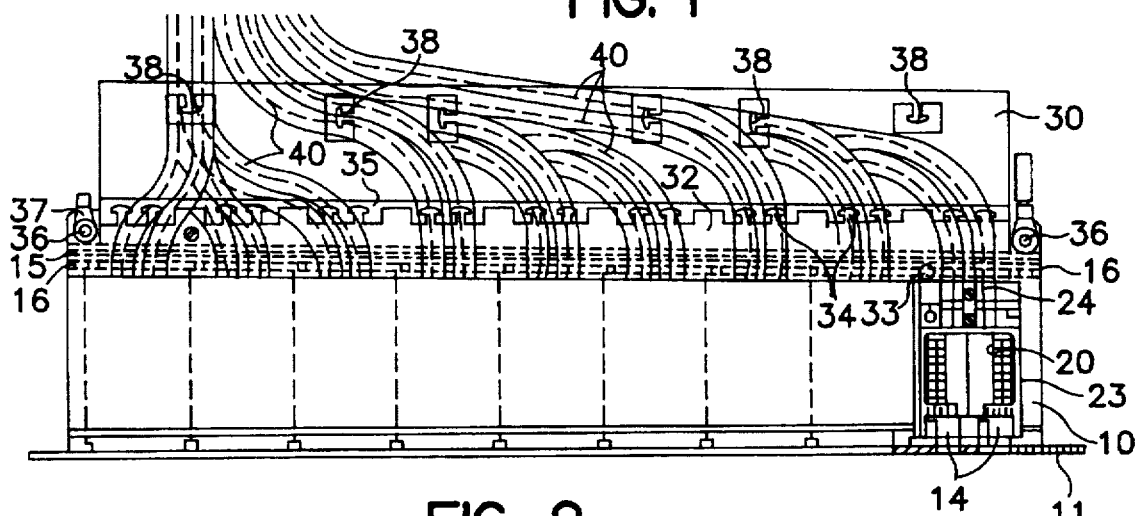
FIG. 2 shows a top plan view of the patch panel.
Figure 4:
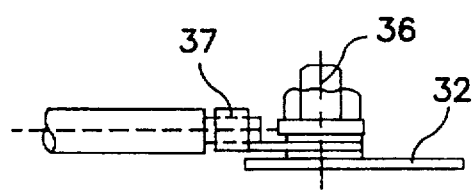
FIG. 4 shows the ground connection of the patch panel in detail.
Figure 3:
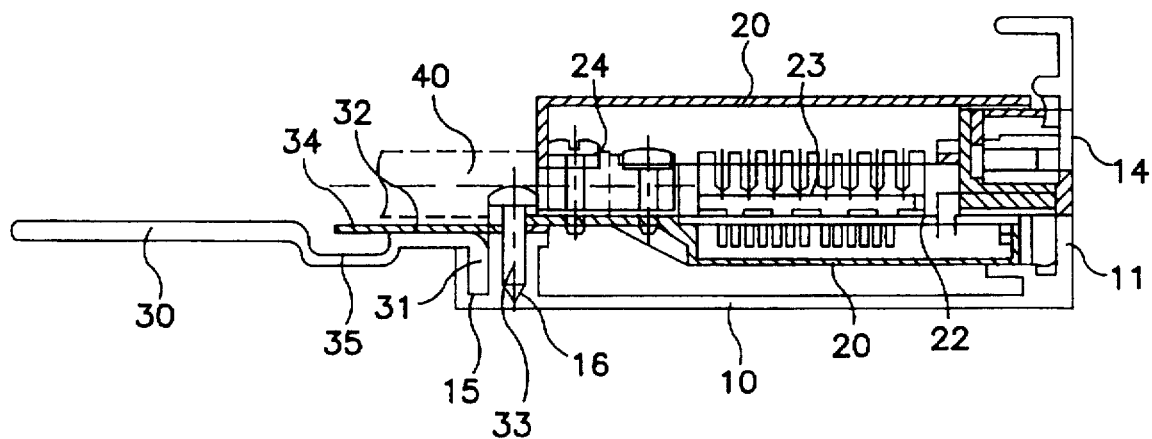
FIG. 3 shows a vertical cross section through the patch panel.

With particular reference to FIGS. 1 and 2, the patch panel assembly has a shaped rail 10, which is preferably an extruded metal section having an elongated front side which mounts an upwardly pointing lateral side forming a front 11 of the patch panel assembly. The front panel 11 is provided with a pair of mounting holes 12 at opposite ends for mounting the patch panel assembly in a housing. Front plate 11 has a series of generally square windows 13 arranged in a row, through which jacks 14 of the patch panel can be accessed as shown on the right hand side of FIG. 1. The exemplary embodiment has 18 jacks 14 which are designed as "Western" jacks for a shielded data network.

As shown, for example in FIG. 2, shielded housings 20 are arranged next to each in modular fashion on shaped rail 10 and each individual housing 20 accepts two jacks 14. The jacks 14 are seated on printed circuit boards 22 mounted in housings 20. Additionally, connecting terminals 23 are also mounted on printed circuit boards 22 and these terminals are connected conductively via circuit pathways of printed circuit boards 22 to the associated jacks 14. Each housing has a strain-relief clips 24 on the rear surface thereof for cables to be connected to terminals 23.

A support plate 30, which is preferably made of extruded metal, is attached to the rear surface of shaped rail 10, i.e., the surface facing away from front plate 11. Support plate 30 is essentially a flat plate, which, after it has been attached, lies in a plane parallel to shaped rail 10. Support plate 30 extends preferably over the entire length of shaped rail 10. At the front edge of support plate 30 facing shaped rail 10, there is an edge strip 31, bent downward at a right angle. To attach support plate 30 to shaped rail 10, this edge strip 31 is inserted into a receiving groove 15, which is open at the top. The groove 15 extends along the rear edge of shaped rail 10. On the side facing the front, receiving groove 15 is adjacent to another shaped groove 16 in shaped rail 10. A clamping rail 32 of metal, which extends along the entire length of shaped rail 10, is set down on top of shaped groove 16 and attached to shaped rail 10. For this purpose, screws 33 are inserted through holes in clamping rail 32, where they serve simultaneously to screw housings 20 to shaped rail 10. Clamping rail 32 attached to shaped groove 16 projects beyond the rear edge of shaped rail 10 and thus extends over the front edge of support plate 30 and its edge strip 31 engaged in an acceptance groove. In this way, clamping rail 32 holds edge strip 31 firmly in the shaped groove and holds support plate 30 tightly against shaped rail, 10.

T-shaped mounting tabs 34, to which cable binders can be attached, are stamped out of the rear, free edge of clamping rail 32. In the area of mounting tabs 34, a trough 35 extending in the longitudinal direction is formed in the shape of support plate 30, so that mounting tabs 34 are freely accessible for the attachment of the cable binders.

Clamping rail 32 is preferably also designed to serve simultaneously as a grounding rail, which can be used to ground both housing 20 and the shielding of the cables. For this purpose, a grounding bolt 36 is seated in each end of clamping rail 32 and connected conductively with it. A cable lug 37 for the connection of a grounding cable is seated on grounding bolt 36.

T-shaped mounting tabs 38 are stamped out of the flat area of support plate 30. As FIG. 2 shows, cables 40 coming from a cable duct, a cable conduit, or a cable harness are laid on support plate 30 and guided along this support plate 30 to housings 20, which hold jacks 14 with connecting terminals 23. To hold cables 40 on support plate 30, cable binders are used, which are attached to mounting tabs 38. Before they enter housings 20, cables 40 are held by another set of cable binders, which are attached to mounting tabs 34 on clamping rail 32. The arrangement of mounting tabs 38 on support plate 30 is thus selected so that each cable 40 is laid parallel to the longitudinal dimension of support plate 30 until it reaches the end, at which point it extends over the rear edge of support plate 30 essentially at a right angle.

What is claimed is:

1. A modular cable distribution assembly for data transmission networks comprising:

a) a shaped rail (10) having a front portion (10a) with a plurality of jacks (14) arranged in a row therein and a receiving groove (15) on a rear longitudinal edge thereof, b) a plurality of printed circuit boards (22) mounted on an inside face of said shaped rail (10), wherein a plurality of cable terminals (23) are mounted on said printed circuit boards (22);

c) a plurality of cables (40) adapted to be electrically and conductively connected to said cable terminals (23);

d) removable shield housings (20) encasing said printed circuit boards (22), said cable terminals (23) and said jacks (14);

e) a detachable support plate (30) having mounting means (38) for holding said cables (40), said detachable support plate (30) having a bent edge strip (31) which fits into said receiving groove (15) so that said detachable support plate (30) can be connected to said rear longitudinal edge of said shaped rail (10) in such a way that a top surface of said support plate (30) lies in a plane essentially parallel to said shaped rail (10); and f) a clamping rail (32) for detachably securing said detachable support plate (30) in said receiving groove (15), said clamping rail extending over said edge strip (31) and said receiving groove (15), said clamping rail having a means (34) assigned to a rear of each said jack for mounting said cables (40) leading to said jacks (14).

2. Distribution panel according to claim 1, characterized in that the clamping rail is designed to function as a grounding rail.

3. Distribution panel according to claim 1, characterized in that said means assigned to a rear of each said jacks are mounting tabs for cable binders stamped out of a free rear edge of the clamping rail.

4. Distribution panel according to claim 1, characterized in that the mounting means of the support plate are mounting tabs for cable binders stamped out of the support plate.

5. A modular cable distribution assembly for data transmission networks comprising:

a) a shaped rail (10) having a front portion (10a) with a plurality of jacks (14) arranged in a row therein and a receiving groove (15) on a rear longitudinal edge thereof;

b) a detachable support plate (30) having mounting means (38) for holding a plurality of cables (40), said detachable support plate (30) having a bent edge strip (31) which fits into said receiving groove (15) so that said detachable support plate (30) can be connected to said rear longitudinal edge of said shaped rail (10) in such a way that a top surface of said support plate (30) lies in a plane essentially parallel to said shaped rail (10); and c) a clamping rail (32) for detachably securing said detachable support plate (30) in said receiving groove (15).

* * * * *